(12) United States Patent
Shimo et al.

(10) Patent No.: US 10,041,395 B2
(45) Date of Patent: Aug. 7, 2018

(54) COMBUSTION CHAMBER STRUCTURE FOR DIESEL ENGINE

(71) Applicant: Mazda Motor Corporation, Aki-gun, Hiroshima (JP)

(72) Inventors: Daisuke Shimo, Hiroshima (JP); Sangkyu Kim, Higashihiroshima (JP); Makoto Namba, Kure (JP); Masahiro Miyazaki, Hiroshima (JP); Yudai Kato, Hiroshima (JP); Shuji Takuma, Hiroshima (JP); Tadashi Tadokoro, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 14/720,609

(22) Filed: May 22, 2015

(65) Prior Publication Data

US 2015/0354439 A1 Dec. 10, 2015

(30) Foreign Application Priority Data

Jun. 9, 2014 (JP) .................................. 2014-119064

(51) Int. Cl.
*F02B 23/06* (2006.01)
*F02F 3/26* (2006.01)
(Continued)

(52) U.S. Cl.
CPC ...... *F02B 23/0672* (2013.01); *F02B 23/0696* (2013.01); *F02F 1/24* (2013.01);
(Continued)

(58) Field of Classification Search
CPC .......... F02B 23/0693; F02B 23/06; F02F 3/26
(Continued)

(56) References Cited

U.S. PATENT DOCUMENTS 4,300,498 A * 11/1981 May .................... F02B 23/0636
123/263
4,858,578 A * 8/1989 Schereer ............. F02B 23/0672
123/276
(Continued)

FOREIGN PATENT DOCUMENTS

AT 005997 U1 2/2003
DE 102009025404 A1 1/2011
(Continued)

OTHER PUBLICATIONS

English machine translation provided by Espacenet of JP2001221050.*
(Continued)

*Primary Examiner* — Jacob Amick
*Assistant Examiner* — Michael A Kessler
(74) *Attorney, Agent, or Firm* — Alleman Hall Creasman & Tuttle LLP

(57) ABSTRACT

A structure of a combustion chamber is provided. The structure includes a cavity formed in a central part of a crown surface of a piston and a wall surface constituting the cavity. The wall surface has a central ridge portion bulging farther toward a bottom surface of a cylinder head toward a center of the cavity, a periphery concave portion formed radially outward of the central ridge portion to concave radially outward, and a lip portion formed between the periphery concave portion and an opening edge of the cavity to convex radially inward. An outer circumferential part of the crown surface has a first portion and a second portion located radially outward of the first portion. A stepped portion is formed between the first and second portions. A stepped portion volume ratio of a stepped portion volume to a top dead center volume is set to 0.1 or smaller.

3 Claims, 11 Drawing Sheets

(51) Int. Cl.
  *F02F 1/24* (2006.01)
  *F02F 7/00* (2006.01)
(52) U.S. Cl.
  CPC .............. *F02F 3/26* (2013.01); *F02F 7/0002* (2013.01); *Y02T 10/125* (2013.01)
(58) Field of Classification Search
  USPC .... 123/276, 279, 285, 298, 659, 193.6, 658, 123/661
  See application file for complete search history.

(56) References Cited

U.S. PATENT DOCUMENTS

| | | | |
|---|---|---|---|
| 6,935,301 B2* | 8/2005 | Liu | F02B 23/0672 123/193.6 |
| 7,096,848 B2* | 8/2006 | Ono | F02B 23/0693 123/193.6 |
| 2010/0122686 A1 | 5/2010 | Kim et al. | |

FOREIGN PATENT DOCUMENTS

| | | |
|---|---|---|
| EP | 3147475 A1 | 3/2017 |
| JP | 2001207853 A | 8/2001 |
| JP | 2001221050 A | 8/2001 |
| JP | 2010121483 A | 6/2010 |
| JP | 2012189041 A | 10/2012 |
| WO | 2004057167 A1 | 7/2004 |
| WO | 2015177898 A1 | 11/2015 |

OTHER PUBLICATIONS

German Patent and Trademark Office, Office Action Issued in German Application No. 102015007212.9, dated Sep. 9, 2016, Munich, Germany, 17 pages. (Submitted with Partial English Translation of Office Action).

* cited by examiner

COMBUSTION CHAMBER STRUCTURE FOR DIESEL ENGINE

BACKGROUND

The present invention relates to a combustion chamber, which is formed inside a diesel engine, defined by an inner surface of a cylinder, a crown surface of a piston, and a bottom surface of a cylinder head, and for being injected with fuel therein, the piston reciprocatable within the cylinder, the cylinder extending along a predetermined central axis, and the cylinder head opposing the crown surface of the piston.

Conventionally, in order to stimulate mixing of fuel with air inside diesel engines where the fuel is directly injected into a combustion chamber, a diesel engine is formed with a cavity in a crown surface of a piston thereof to concave in a direction away from a cylinder head so that a vertical flow of the fuel spray along a wall surface of the cavity (i.e., a tumble flow) is formed by a fuel injection.

For example, JP2010-121483A discloses a combustion chamber structure in which a cavity is formed in a central part of a crown surface of a piston. The cavity is formed to be a so-called reentrant cavity (i.e., a cavity bulging at its central ridge portion and tapering upward at its opening portion), and a fuel injection device is attached to the combustion chamber so that fuel spray is injected toward a part of a wall surface of the cavity, on an opposite side from a cylinder head with respect to an opening edge of the cavity.

With the combustion chamber structure of JP2010-121483A, the fuel spray is injected to collide against a part of the wall surface of the cavity on the opposite side from the cylinder head with respect to the opening edge first, directed downward and then toward the center from the outer circumferential side along the wall surface of the cavity, and further directed toward the fuel injection device. Thus, the fuel can effectively be mixed with air.

Here, by providing the reentrant cavity as described above, the mixing of the fuel with air is stimulated, hazardous combustion products ($NO_x$, soot (i.e., smoke)) can be reduced, and fuel consumption can be improved. Specifically, in a diesel engine in which the reentrant cavity is formed in the piston, when a comparatively large amount of fuel is injected from a fuel injector within a medium or high engine load range, spray of the fuel flows to a circumferential edge portion of the cavity and a flow of the spray reverses along a wall surface of the cavity (changes the direction toward the center of the cavity), namely a tumble flow, occurs. Thus, the mixing of the fuel with air is stimulated. Therefore, the hazardous combustion products ($NO_x$, soot) are reduced while improving the fuel consumption.

Here, the reduction effect against the hazardous combustion products (i.e., the mixing effect of the fuel and air) becomes greater as the volume of the cavity is larger and the tumble flow produced within the cavity becomes stronger.

On the other hand, after the piston reaches a top dead center, a combustion chamber volume is increased as the piston descends. Here, a flow of combustion gas occurs within the combustion chamber to lead the combustion gas outward of the cavity in a radial direction thereof where an increase ratio of the combustion chamber volume is large. Thus, heat of the combustion gas is transmitted to a periphery of a lip portion and causes cooling loss. The cooling loss becomes larger as the combustion chamber volume on the radially outward side of the cavity at the top dead center becomes smaller (i.e., as the cavity becomes larger). Specifically, since the combustion chamber volume on the radially outward side of the cavity has to become smaller as the cavity becomes larger, the increase ratio of the combustion chamber volume on the radially outward side of the cavity becomes large, the flow of the gas within this outward section becomes stronger, and the cooling loss becomes greater.

Therefore, to reduce the generation of the hazardous combustion products while reducing the cooling loss and also improving the fuel consumption, it becomes a challenge to design the cavity of the combustion chamber and the combustion chamber volume on the outward side of the cavity suitably.

SUMMARY

The present invention is made in view of the above situations and aims to provide a combustion chamber structure for a diesel engine, which is able to improve fuel consumption while reducing generation of hazardous combustion products.

According to one aspect of the present invention, a structure of a combustion chamber is provided. The combustion chamber is formed inside a diesel engine, defined by an inner surface of a cylinder, a crown surface of a piston, and a bottom surface of a cylinder head, and is injected with fuel therein. The piston is reciprocatable within the cylinder. The cylinder head opposes the crown surface of the piston. The structure includes a cavity formed in a central part of the crown surface of the piston to concave in a direction away from the bottom surface of the cylinder head, and a wall surface constituting the cavity. The wall surface has a central ridge portion bulging farther toward the bottom surface of the cylinder head toward the center of the cavity, a periphery concave portion formed outward of the central ridge portion in a radial direction of the piston and formed to concave radially outward in a vertical cross-section, and a lip portion formed between the periphery concave portion and an opening edge of the cavity and formed to convex radially inward in the vertical cross-section. An outer circumferential part of the crown surface of the piston has a first portion formed continuously from the lip portion and a second portion located radially outward of the first portion. The outer circumferential part corresponds to a radially outward part with respect to the lip portion of the cavity. The first portion is located in the direction away from the bottom surface of the cylinder head with respect to the second portion, so as to form a stepped portion between the first and second portions. A stepped portion volume ratio VR defined by V_STEP/V_TDC is set to 0.1 or smaller, in which V_STEP is a stepped portion volume and V_TDC is a top dead center volume. The stepped portion volume is a volume of a part of the combustion chamber that is defined by the wall surface of the piston across the lip portion, the first portion and the stepped portion, a surface passing through a radially inner edge of the lip portion and extending in parallel to a central axis of the cylinder, and a surface passing through a connecting position of the stepped portion and the second portion and extending perpendicularly to the central axis of the cylinder. The top dead center volume is a volume of the combustion chamber in a state where the piston is at a top dead center.

According to this configuration, a cooling loss can be reduced and the fuel consumption can be improved.

Specifically, since the stepped portion is formed in the outer circumferential part of the piston crown surface and a comparatively long distance between the first portion extending radially outward from the lip portion of the cavity and the bottom surface of the cylinder head is secured, an increase ratio of a volume above the first portion located on the radially outward side of the cavity can be reduced when the combustion chamber volume is increased as the piston descends. Therefore, when the piston descends, the cooling loss can be reduced by lowering heat transmissibility from gas flowing into the first portion from the cavity, to a wall surface of the combustion chamber.

Moreover, according to the above configuration, the wall surface constituting the cavity has the central ridge portion bulging farther toward the bottom surface of the cylinder head toward the center of the cavity, the periphery concave portion formed outward of the central ridge portion in the radial direction of the piston and formed to concave radially outward in the vertical cross-section, and the lip portion formed between the periphery concave portion and the opening edge of the cavity and formed to convex radially inward in the vertical cross-section. Therefore, when the fuel is injected, a tumble flow oriented toward the opposite side from the cylinder head along the lip portion and the periphery concave portion first, and then toward the cylinder head while oriented toward the central axis of the cylinder, can be produced in the combustion chamber. Mixing of the fuel with air is stimulated by the tumble flow, and thus, generation of hazardous combustion products can be reduced.

Furthermore, according to the above configuration, the stepped portion volume ratio VR is set to 0.1 or smaller, so that the volume of the part of the combustion chamber that is on the radially outward side of the cavity and provided continuously from the cavity is inhibited from becoming excessively large and the volume of the cavity is secured. Therefore, as described above, the cooling loss can be reduced and the fuel consumption can be improved. At the same time, generation of soot can be reduced more surely by securing the strength of the tumble flow.

Specifically, by increasing the stepped portion volume V_STEP which is the volume above the lip portion and the first portion, across which the gas moving radially outward from the cavity by being carried on a flow oriented toward the radially outward side from the cavity as the piston descends (i.e., reverse squish flow) passes, for example, a flow speed of the gas sucked into the first portion from the cavity is reduced. Thus, a heat transfer amount to the wall surface of the combustion chamber is reduced and thereby the cooling loss can be reduced. However, the volume of the entire combustion chamber has a limitation in its variety in view of a required emission and a required compression ratio. Therefore, if the stepped portion volume V_STEP is increased, the volume of the cavity is reduced and a sufficient tumble flow cannot be produced within the cavity. As a result, the soot generation amount becomes larger. On this matter, the present inventors conducted extensive research and found, as a result, that a drastic increase of soot occurs when the stepped portion volume ratio VR=V_STEP/V_TDC, which is the ratio between the stepped portion volume V_STEP and the top dead center volume V_TDC of the combustion chamber, is increased to exceed 0.1. Therefore, according to the above configuration, the increase of the soot generation amount can be prevented while the cooling loss is reduced and the fuel consumption is improved as described above, by providing the stepped portion and setting the stepped portion volume ratio VR to 0.1 or smaller.

A height of the stepped portion is preferably set to 0.5 mm or higher.

With this configuration, even if soot or the like is accumulated on the first portion, the volume above the first portion, in other words the volume of the section between the stepped portion and the lip portion, is secured. Therefore, the heat transfer amount from the gas to the wall surface of the combustion chamber within the section can be reduced more surely.

Here, regarding the relationship of the cooling loss and soot with the stepped portion volume ratio VR, the present inventors also found that in a case where the stepped portion volume ratio VR is set smaller than 0.04, as the stepped portion volume ratio VR is reduced, the cooling loss increases while the soot generation amount hardly changes. Therefore, in order to effectively obtain a reduction effect of the cooling loss while reducing soot to some extent, the stepped portion volume ratio VR is preferably set to 0.04 or larger.

Moreover, the present inventors found that the stepped portion volume ratio VR with which both the reduction effect of the cooling loss (i.e., the improvement effect of the fuel consumption) and the soot reduction effect are stably achieved is between 0.06 and 0.08. Therefore, the stepped portion volume ratio VR is preferably set to be within the range of 0.06 to 0.08.

DETAILED DESCRIPTION OF EMBODIMENT

Hereinafter, a combustion chamber structure for a diesel engine according to one embodiment of the present invention is described with reference to the appended drawings.

(1) Overall Configuration

First, a diesel engine system 100 to which the combustion chamber structure for the diesel engine of this embodiment is applied is schematically described.

Figure 1:
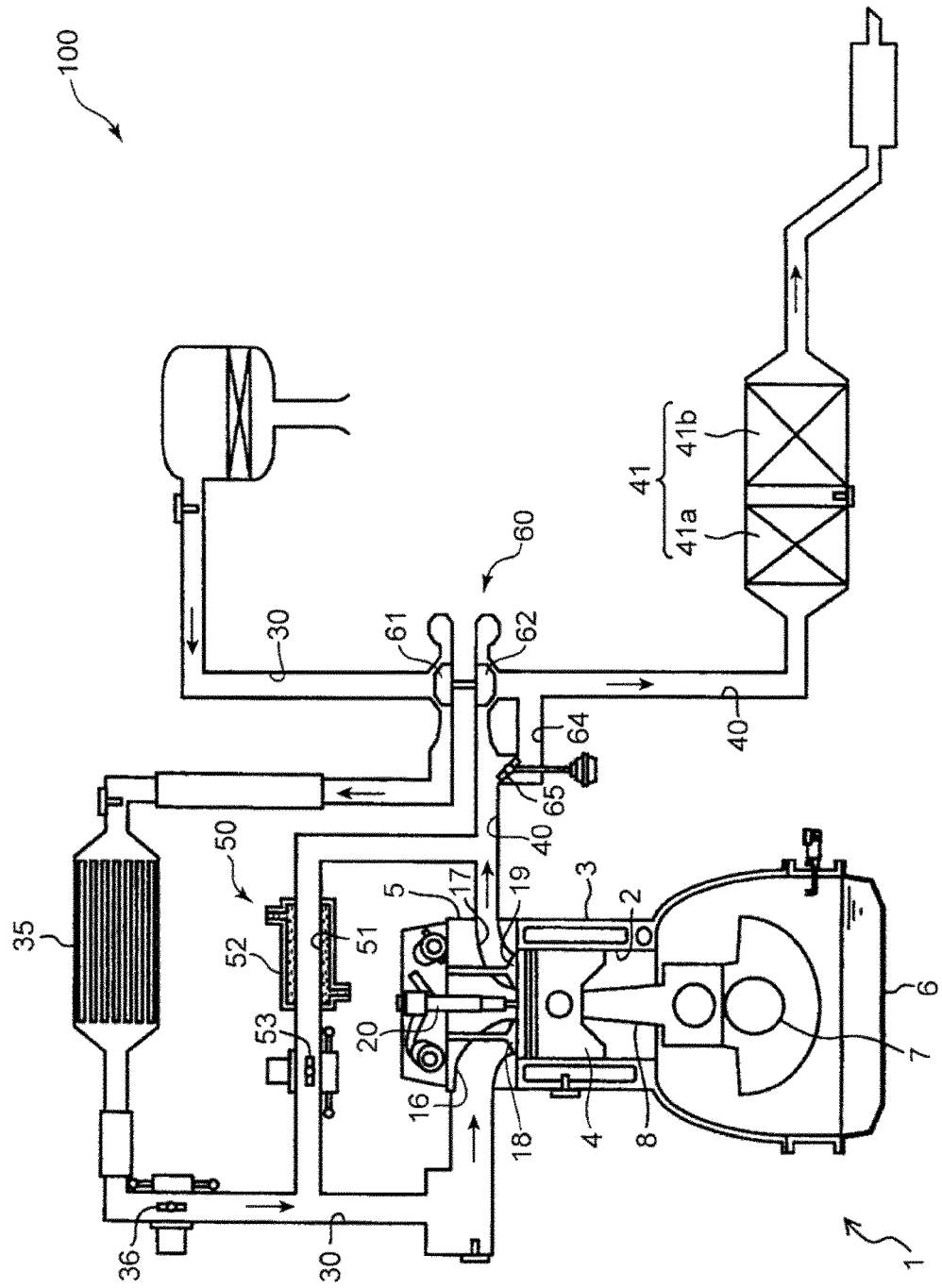
FIG. 1 is a schematic view illustrating a diesel engine system according to one embodiment of the present invention.

FIG. 1 is a schematic view illustrating the diesel engine system 100. The diesel engine in FIG. 1 is a four-cycle diesel engine to be mounted in a vehicle as a drive force source for traveling. Specifically, the diesel engine system 100 includes a diesel engine body (hereinafter, simply referred to as the engine body) 1 that is driven by receiving fuel mainly containing diesel fuel, an intake passage 30 for introducing air for combustion into the engine body 1, an exhaust passage 40 for discharging exhaust gas (combustion gas) generated by the engine body 1, an EGR (exhaust gas recirculation) device 50 for circulating part of the exhaust gas passing through the exhaust passage 40 back to the intake passage 30, and a turbocharger 60 that is driven by the exhaust gas passing through the exhaust passage 40.

Figure 2:
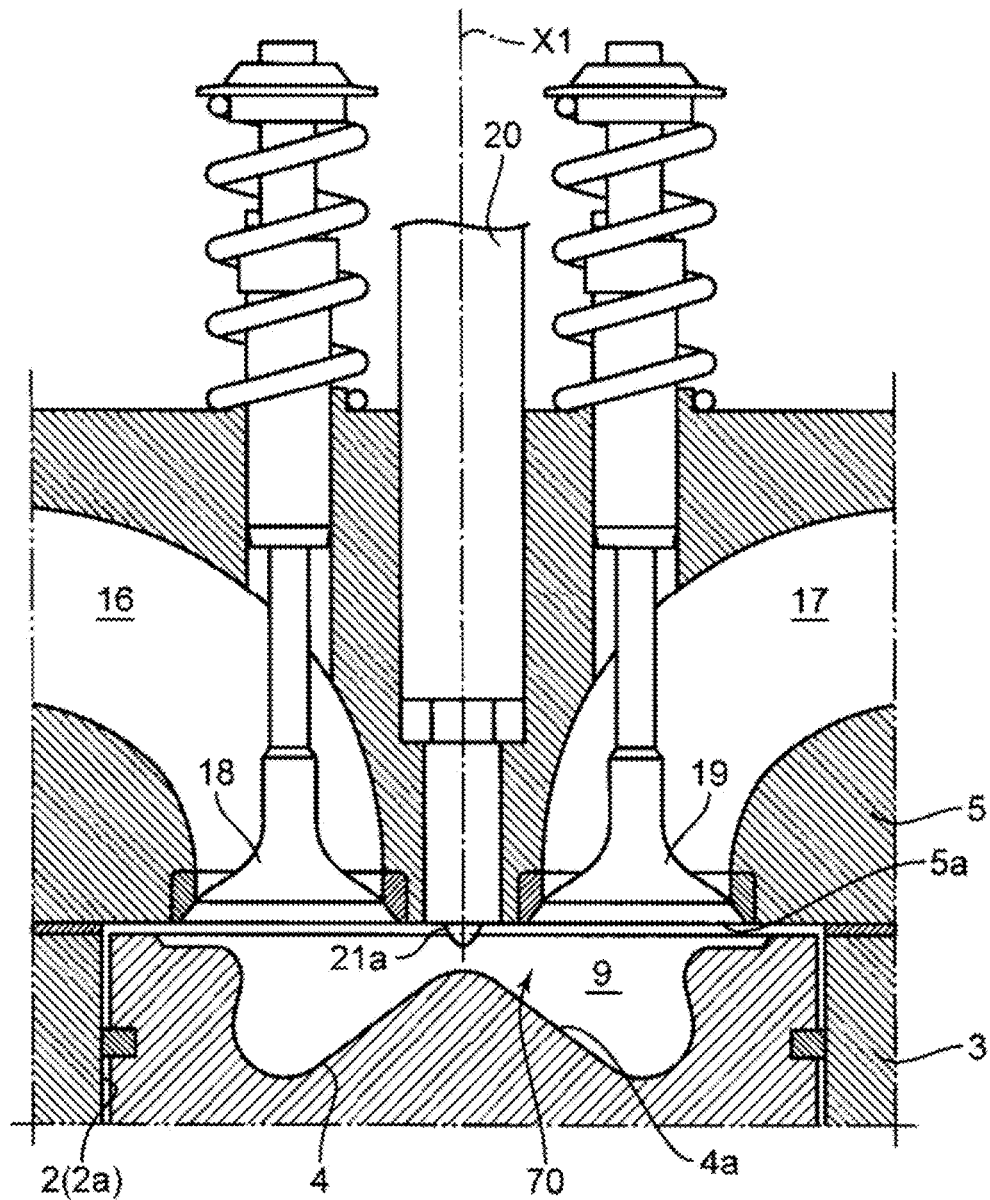
FIG. 2 is a schematic cross-sectional view of a part near a combustion chamber of the diesel engine in FIG. 1.

FIG. 2 is a cross-sectional view illustrating a part of the engine body 1 in an enlarged manner. As illustrated in FIG. 2 and also FIG. 1 described above, the engine body 1 includes a cylinder block 3 formed therein with one or more cylinders 2, a piston 4 accommodated inside each of the one or more cylinders 2 to be reciprocatable along a central axis X1 of the cylinder 2, a cylinder head 5 coupled to the cylinder block 3 via a gasket, and an oil pan 6 disposed below the cylinder block 3 to store a lubricant therein. Hereinafter, directions in parallel to the central axis X1 of the cylinder 2 may be referred as vertical directions, and a cylinder head 5 side may be referred to as the upper side, and a cylinder block 3 side may be referred to as the lower side.

The piston 4 is coupled to a crankshaft 7 via a connecting rod 8. The crankshaft 7 is an output shaft of the engine body 1. Moreover, a combustion chamber 9 is formed on the piston 4, and the fuel injected by an injector 20 (described later) is mixed with air and causes diffusion combustion inside the combustion chamber 9. Further, by expansion energy caused by the combustion, the piston 4 reciprocates while the crankshaft 7 rotates around its central axis. The detailed description of the combustion chamber 9 will be given later.

Here, a geometric compression ratio of the engine body 1, specifically a ratio between a combustion chamber volume when the piston 4 is at a bottom dead center (BDC) and a combustion chamber volume when the piston 4 is at a top dead center (TDC), is set to be between 12:1 and 15:1 (e.g., 14:1). The range of 12:1 to 15:1 is considerably low for a geometric compression ratio of a diesel engine. Such a range is adopted so as to reduce a combustion temperature and, thus, improve emission performance and thermal efficiency.

The cylinder head 5 is formed with an intake port 16 for introducing air supplied from the intake passage 30 into the combustion chamber 9, an exhaust port 17 for discharging the exhaust gas generated inside the combustion chamber 9 to the exhaust passage 40, an intake valve 18 for opening and closing the intake port 16 to the combustion chamber 9 side, and an exhaust valve 19 for opening and closing the exhaust port 17 to the combustion chamber 9 side. Moreover, the injector 20 for injecting the fuel into the combustion chamber 9 is attached to the cylinder head 5. The injector 20 is attached such that a tip part 21a thereof is oriented toward inside the combustion chamber 9.

The EGR device 50 has an EGR passage 51 coupling the exhaust passage 40 to the intake passage 30, and an EGR cooler 52 and an EGR valve 53 disposed to the EGR passage 51. The EGR valve 53 is opened or closed to adjust a flow rate of the exhaust gas circulated from the exhaust passage 40 back to the intake passage 30 through the EGR passage 51, namely, the EGR gas. The EGR cooler 52 is a heat exchanger for cooling the EGR gas. The EGR valve 53 is opened largely and introduces a sufficient amount of EGR gas into the engine body 1, for example, when an engine load is comparatively low. Thus, the combustion temperature is reduced and the emission performance is improved.

The turbocharger 60 has a compressor 61 disposed in the intake passage 30, a turbine 62 coaxially coupled to the compressor 61 and disposed inside the exhaust passage 40, a bypass passage 64 formed in the exhaust passage 40 so as to bypass the turbine 62, and a wastegate valve 65 for opening and closing the bypass passage 64. The turbine 62 rotates by receiving the energy of the exhaust gas flowing inside the exhaust passage 40. The compressor 61 compresses (forcibly induces) the air flowing through the intake passage 30 by rotating in cooperation with the turbine 62. The wastegate valve 65 is opened when a turbocharging pressure by the turbocharger 60 exceeds an upper limit value so as to prevent excessive increase of the forced induction pressure.

An intercooler 35 for cooling the air compressed by the compressor 61, and a throttle valve 36 are disposed at the downstream side (downstream in a flow direction of intake air) of the intake passage 30 with respect to the compressor 61. Note that the throttle valve 36 is basically kept fully open or at a largely open state close to the fully open state while the engine is in operation, and is only closed when needed (e.g., when the engine is stopped) to shut the intake passage 30.

An exhaust emission control device 41 for purifying hazardous components within the exhaust gas is disposed at the downstream side (downstream in a flow direction of the exhaust gas) of the exhaust passage 40 with respect to the turbine 62. The exhaust emission control device 41 includes an oxidation catalyst 41a for oxidizing CO and HC within the exhaust gas and a DPF (diesel particulate filter) 41b for capturing soot within the exhaust gas.

(2) Combustion Chamber Structure

Next, the structure of the combustion chamber 9 is described in detail.

(2-1) Overall Structure

Figure 3:
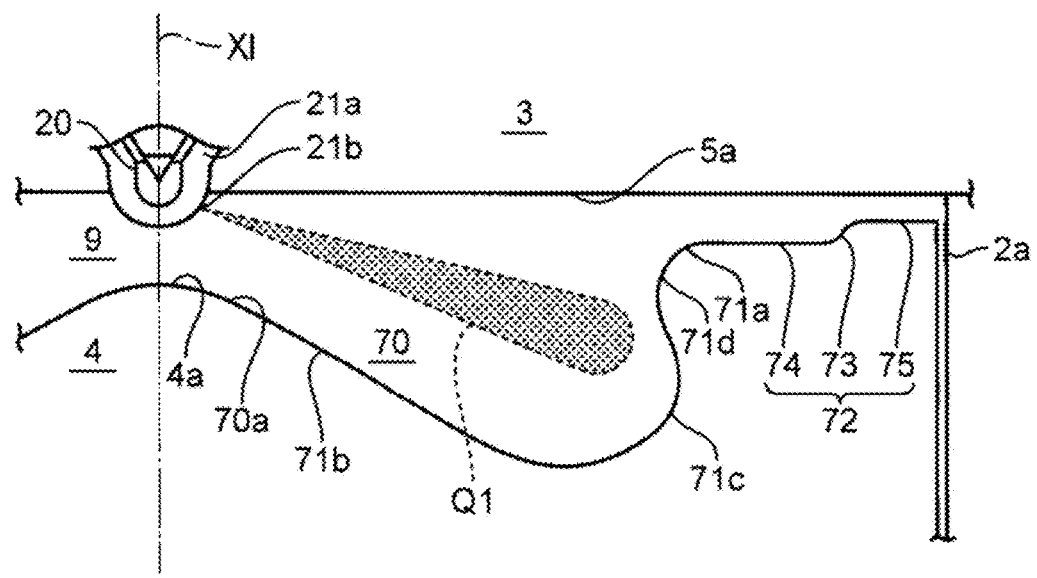
FIG. 3 is a cross-sectional view of the combustion chamber in a state where a piston is at a top dead center.
Figure 4:
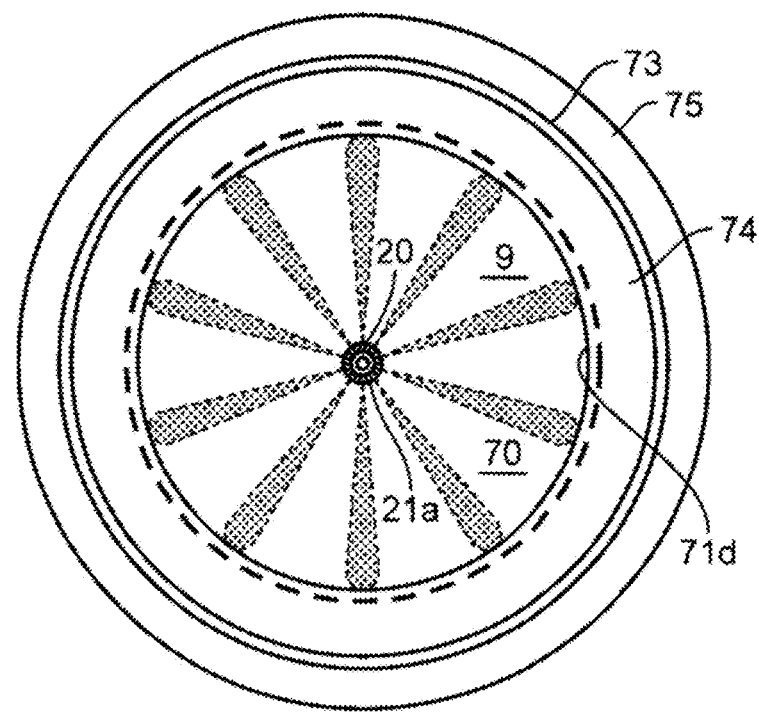
FIG. 4 is a schematic top view of the combustion chamber.

FIG. 3 is a cross-sectional view of the combustion chamber 9 in a state where the piston 4 is at the TDC. FIG. 4 is a schematic top view of the combustion chamber 9.

As illustrated in FIG. 2, the combustion chamber 9 is defined by a bottom surface 5a of the cylinder head 5, a crown surface 4a of the piston 4 (hereinafter, may simply be referred to as the piston crown surface 4a), and an inner surface 2a of the cylinder 2.

The injector 20 is arranged such that its central axis matches with the central axis X1 of the cylinder 2 and the tip part 21a is located at a central position of a ceiling part of the combustion chamber 9 (i.e., a part of the bottom surface 5a of the cylinder head 5, opposing the piston crown surface 4a). The injector 20 is a multi-hole type, and the fuel is injected from a plurality of nozzle holes 21b formed in the tip part 21a into the combustion chamber 9 to spread radially therein. In this embodiment, as illustrated in FIG. 4, the injector 20 has ten nozzle holes 21b.

(2-2) Configuration of Cavity

A cavity 70 concaving downward is formed in a central part of the piston crown surface 4a (a central part in a radial direction of the piston 4). The cavity 70 is formed to have a linearly-symmetric shape with respect to the central axis X1, in all cross sections extending in parallel to the central axis X1 of the piston 4.

The cavity 70 is a so-called reentrant type, and has a shape bulging at a central ridge portion 71b thereof and tapering upward at an opening portion thereof.

Specifically, an inner surface 70a of the cavity 70, in other words, a wall surface 70a constituting the cavity 70 has the central ridge portion 71b bulging farther toward the bottom surface 5a of the cylinder head (hereinafter, may simply be referred to as the cylinder head bottom surface 5a) toward the center of the cavity 70 (i.e., the central axis X1 of the cylinder 2), a periphery concave portion 71c formed radially outward of the central ridge portion 71b and formed to concave radially outward in a vertical cross-section, and a lip portion 71d formed between the periphery concave portion 71c and an opening edge 71a of the cavity 70 and formed to convex radially inward in the vertical cross-section. In this embodiment, each of the lip portion 71d and the periphery concave portion 71c is curvy, and the curvature from the lip portion 71d toward the periphery concave portion 71c continuously changes.

As described above, the injector 20 is disposed to inject the fuel to spread radially within the combustion chamber 9, and particularly in this embodiment, as indicated by a reference mark Q1 in FIG. 3, the injector 20 is arranged such that the fuel is injected toward a position near a boundary of the lip portion 71d and the periphery concave portion 71c in a case where the piston 4 is near a compression TDC (CTDC). Further, a distance between the boundary and the central axis X1 of the piston 4 in a direction orthogonal to the central axis X1 is set to a length with which the injected fuel does not directly (in the form of droplets) contact with the boundary.

Note that as such a cavity 70, a cavity disclosed in JP2010-121483A may be applied, for example.

(2-3) Structure of Outer Circumferential Part of Piston Crown Surface

A stepped portion 73 is formed in an outer circumferential part 72 of the piston crown surface 4a, located radially outward of the opening edge 71a of the cavity 70. Specifically, a first portion 74 extending radially outward from the opening edge 71a of the cavity 70 (i.e., the first portion 74 that is a radially inward portion of the outer circumferential part 72 of the piston crown surface 4a) is located lower than a second portion 75 located radially outward of the first portion 74 (i.e., the second portion 75 that is a radially outward portion of the outer circumferential part 72 of the piston crown surface 4a), so as to form the stepped portion 73 in the outer circumferential part 72 of the piston crown surface 4a.

Figure 5:
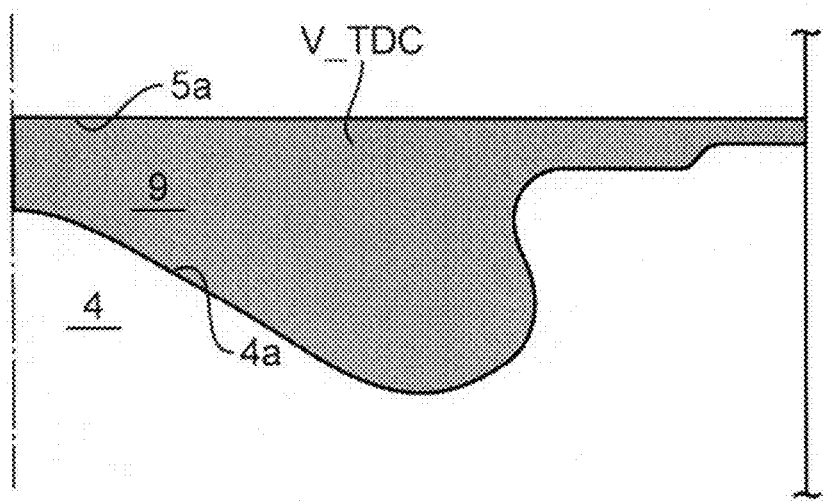
FIG. 5 is a view for describing a combustion chamber volume at the top dead center.
Figure 6:
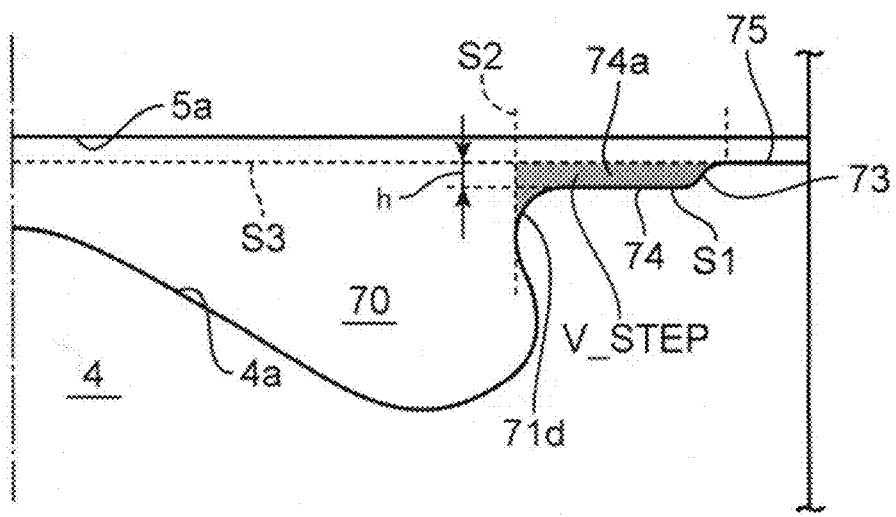
FIG. 6 is a view for describing a volume of a stepped portion volume section.

The stepped portion 73 is provided to have a stepped portion volume ratio VR of about 0.07. The stepped portion volume ratio VR is defined by V_STEP/V_TDC in which V_STEP is a stepped portion volume illustrated in FIG. 6 and V_TDC is a TDC volume that is a volume of the combustion chamber 9 in the state where the piston 4 is at the TDC as illustrated in FIG. 5. Specifically, the stepped portion volume V_STEP is a volume of a part of the combustion chamber 9, defined by a wall surface S1 of the piston 4 across the lip portion 71d, the first portion 74 and the stepped portion 73, a surface S2 passing through a radially inner edge of the lip portion 71d and extending in parallel to the central axis X1 of the cylinder 2, and a surface S3 passing through the connecting position of the stepped portion 73 and the second portion 75 and extending perpendicularly to the central axis X1 of the cylinder 2. Hereinafter, this part of the combustion chamber 9 may be referred to as the stepped portion volume section 74a. Moreover, the TDC volume V_TDC is the volume of the section between the piston crown surface 4a and the cylinder head bottom surface 5a in the state where the piston 4 is at the TDC. In this embodiment, the stepped portion volume ratio VR is set to 0.07.

Moreover, a height h of the stepped portion 73, in other words, a separation distance h between the first and second portions 74 and 75 in the vertical directions (see FIG. 6) is set to 0.5 mm or longer. In this embodiment, the height h of the stepped portion 73 is set to 1.0 mm. Note that an upper end portion of the piston crown surface 4a, in other words, a top surface of the second portion 75, is separated downwardly from the cylinder head bottom surface 5a with a predetermined clearance secured therebetween. The predetermined clearance at the CTDC is about 0.8 mm, for example.

(3) Flow of Gas within Combustion Chamber and Effects Thereof (3-1) Outline

Figure 7A:
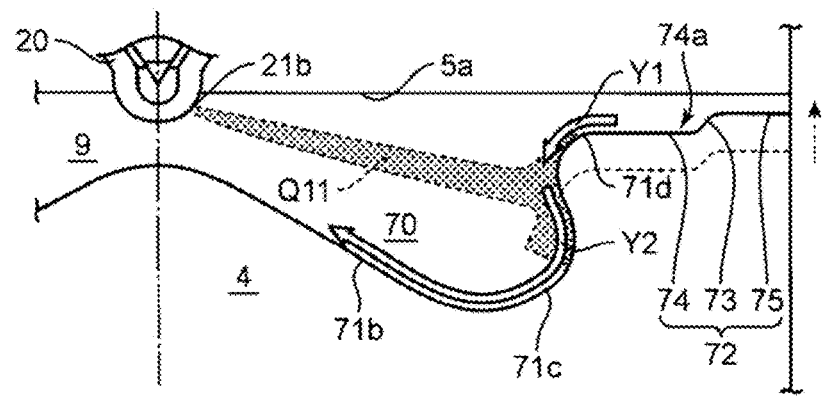
FIG. 7A is a view illustrating a flow of gas in an early stage of combustion.
Figure 7B:
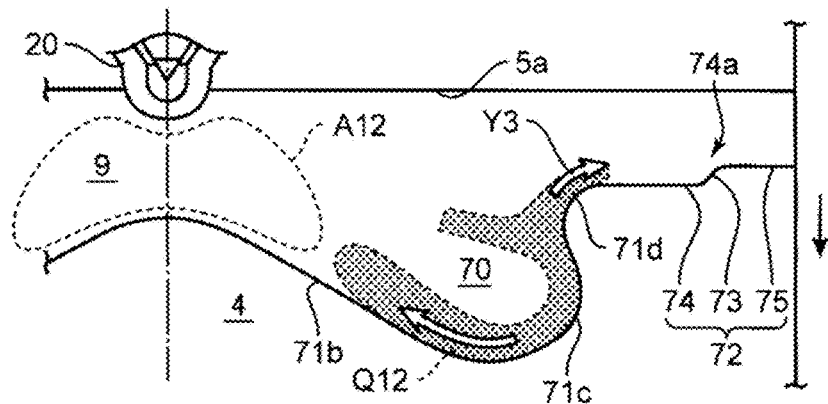
FIG. 7B is a view illustrating a flow of the gas in an intermediate stage of the combustion.
Figure 7C:
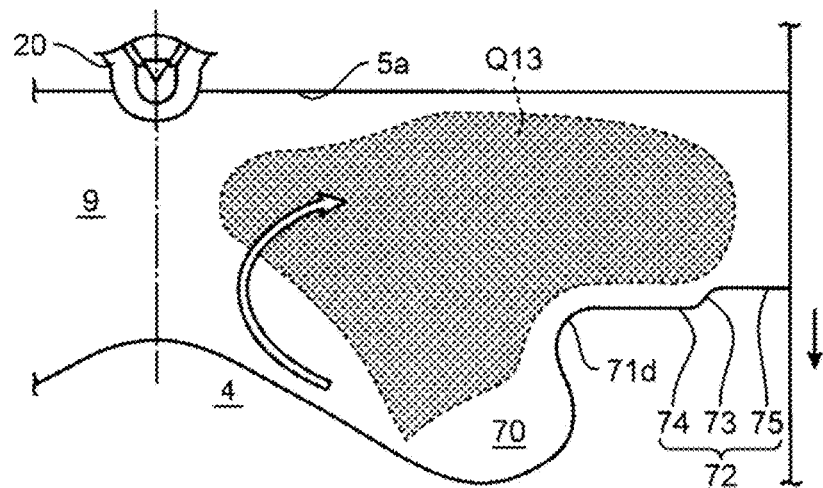
FIG. 7C is a view illustrating a flow of the gas in a final stage of the combustion.

The flow of gas within the combustion chamber 9 configured as above is described with reference to FIGS. 7A to 7C. FIG. 7A illustrates the status when the piston 4 is near the CTDC and combustion is started, in other words, an early stage of combustion. FIGS. 7B and 7C illustrate the statuses after FIG. 7A chronologically in this order, in which FIG. 7B is the status in an intermediate stage of the combustion and FIG. 7C is the status in a final stage of the combustion.

As indicated by the arrow Y1 of FIG. 7A, near the CTDC, as the piston 4 elevates before the CTDC, a squish flow is produced by gas (air) flowing toward the cavity 70 from a part of the combustion chamber 9 between the outer circumferential part 72 of the cavity 70 and the cylinder head bottom surface 5a. Then, due to a fuel injection, a tumble flow toward the center from the outer circumferential side occurs within the cavity 70 along the inner surface of the cavity 70 as indicated by the arrow Y2. That is, the tumble flow occurs within the cavity 70 due to fuel spray colliding against the wall surface of the cavity 70, particularly the part lower than the lip portion 71d. Specifically, the tumble flow which flows downward along the lip portion 71d first, then toward the central axis of the cylinder 2 along the periphery concave portion 71c, and further toward the central axis of the cylinder 2 while flowing upward along the central ridge portion 71b occurs within the cavity 70. Particularly in this embodiment, each of the lip portion 71d and the periphery concave portion 71c is curvy, and the curvature from the lip portion 71d toward the periphery concave portion 71c continuously changes. Therefore, the movement of the gas within the cavity 70 along the wall surface of the cavity 70 can be achieved more surely, and a stable tumble flow is produced.

By injecting the fuel into the cavity 70 as above, the tumble flow is produced within the cavity 70 and the fuel spray moves downward by being carried on the tumble flow as indicated by Q11. The combustion using a part of the fuel is already started by this point, and the fuel spray and the combustion gas move downward.

As described above, in this embodiment, the fuel is injected toward the position near the boundary of the lip portion 71d and the periphery concave portion 71c of the cavity 70, and the boundary curves radially outward to the lower side, so that the fuel spray collides against the boundary at a small angle. Therefore, the fuel spray smoothly moves downward along the wall surface of the cavity 70 while the fuel spray is suppressed from adhering onto the wall surface of the cavity 70 and scattering around. Further, in this embodiment, the distance between the boundary and the central axis X1 of the piston 4 is set to the length with which the injected fuel does not directly (in the form of droplets) contact with the boundary as described above. The adhesion of the fuel onto the wall surface of the cavity 70 is also suppressed by setting such a distance.

As indicated by Q12 in FIG. 7B, the fuel spray and the combustion gas, after moving downward along the periphery concave portion 71c of the cavity 70, are accelerated by further moving along the periphery concave portion 71c, then move to the central ridge portion 71b of the cavity 70 while blowing away the fuel adhered onto the wall surface of the cavity 70 without interfering with the part of the fuel spray still flowing toward the wall surface of the cavity 70, so as to be mixed with air A12 existing within a central section of the cavity 70.

Thereafter, as indicated by Q13 in FIG. 7C, the combustion gas is evenly diffused over the entire combustion chamber 9 while the piston 4 descends, and the air within the entire combustion chamber 9 is efficiently combusted.

Thus, in this embodiment, since the fuel spray moves by being carried on the tumble flow along the wall surface of the cavity 70, the fuel spray can be inhibited from becoming locally rich due to the accumulation of the fuel or interference. Thus, the mixing of the air with the fuel is stimulated and uniform and lean combustion gas is generated.

(3-2) Cooling Loss

Here, as illustrated in FIG. 7B, after the CTDC, as the volume of the radially outward part of the combustion chamber 9 with respect to the cavity 70 increases due to the piston 4 descending, the pressure inside the radially outward part decreases. Therefore, as indicated by the arrow Y3, a reverse squish flow from the cavity 70 toward the radially outward side of the cavity 70 occurs within the combustion chamber 9.

As described above, once the fuel is injected, part of the fuel immediately starts to combust and high-temperature combustion gas is generated. Therefore, the high-temperature combustion gas is partially carried on the reverse squish flow and sucked into the radially outward part with respect to the cavity 70. Thus, in the radially outward part, the heat within the high-temperature combustion gas is released to the wall surface of the combustion chamber 9 and a cooling loss occurs. The cooling loss occurs particularly at the lip portion 71d of the cavity 70 across which the combustion gas moving by being carried on the reverse squish flow passes, and the first portion 74 provided continuously from the lip portion 71d.

However, in this embodiment, the stepped portion 73 is formed in the outer circumferential part 72 of the piston crown surface 4a as described above and the first portion 74 provided continuously from the lip portion 71d is disposed on the lower side of the stepped portion 73, so as to secure a large volume above the first portion 74 and the lip portion 71d provided continuously therefrom. Therefore, an increase speed of the volume above these portions (i.e., the radially outward part with respect to the cavity 70) is reduced to be low and thus the cooling loss is reduced. That is, by reducing the increase speed of the volume to be small, the flow speed of the combustion gas passing across the lip portion 71d and the first portion 74 is reduced to be low and, thus, a heat transmissibility between the gas and the wall surface at the lip portion 71d and the first portion 74 becomes low. As a result, the heat transfer amount from the gas to the wall surface is reduced to be small. Moreover, the heat transfer amount from the gas to the wall surface is also reduced to be small due to a suitable distance being secured between the high-temperature combustion gas and the wall surface of the combustion chamber 9 because the volume above the lip portion 71d and the first portion 74 is large.

Figure 8B:
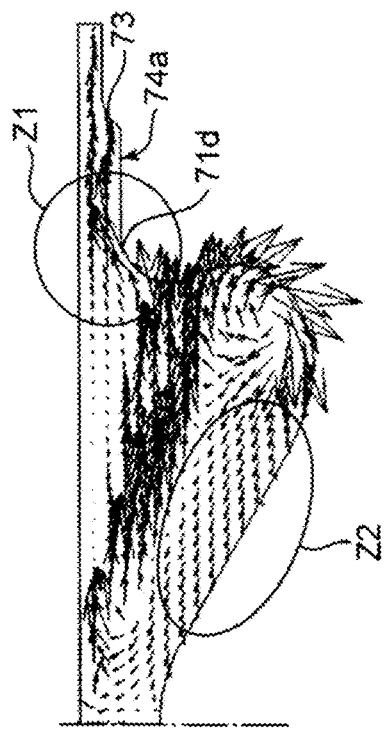
FIG. 8B is a view illustrating a flow of the gas inside the combustion chamber according to this embodiment.
Figure 8A:
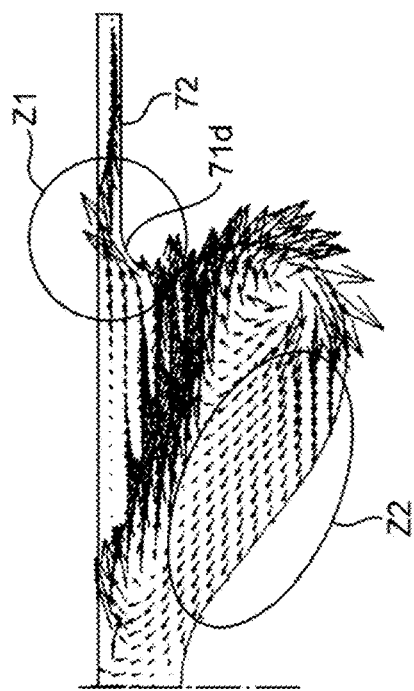
FIG. 8A is a view illustrating a flow of gas inside a combustion chamber without a stepped portion volume section.
Figure 9B:
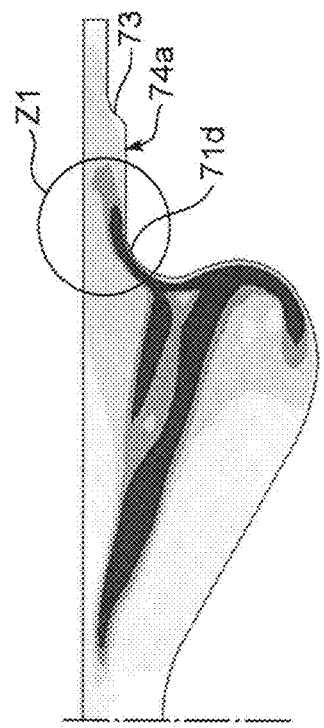
FIG. 9B is a view illustrating a flow rate of the gas inside the combustion chamber according to this embodiment.
Figure 9A:
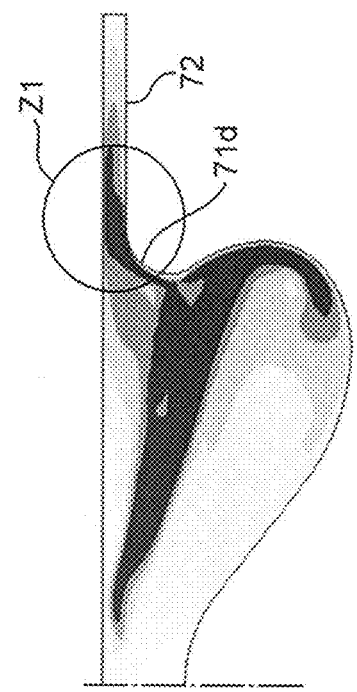
FIG. 9A is a view illustrating a flow rate of gas inside the combustion chamber without the stepped portion volume section.
Figure 10A:
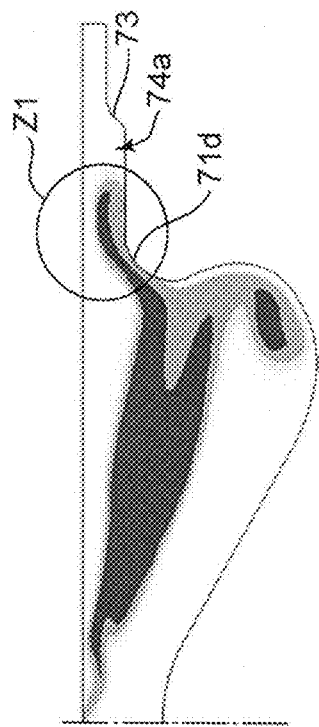
FIG. 10A is a view illustrating a temperature distribution inside the combustion chamber without the stepped portion volume section.
Figure 10B:
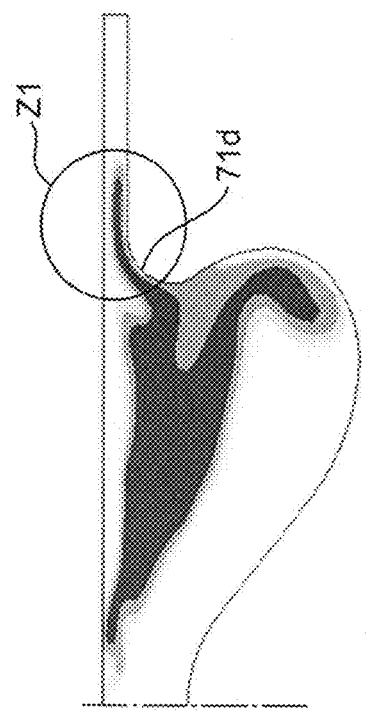
FIG. 10B is a view illustrating a temperature distribution inside the combustion chamber according to this embodiment.

In this regard, a detailed description is given as follows with reference to FIGS. 8A and 8B, 9A, and 9B, and 10A and 10B. FIGS. 8A, 9A, and 10A illustrate views of a combustion chamber that is not provided with the stepped portion 73 but is provided with the outer circumferential part 72 at the radially outward portion of the piston crown surface 4a with respect to the cavity 70, wherein the outer circumferential part 72 extends in parallel to the cylinder head bottom surface 5a at a close position thereto. FIGS. 8B, 9B, and 10B illustrate views of the combustion chamber 9 of this embodiment. FIGS. 8A and 8B illustrate results of flow of the gas within the combustion chambers obtained by CFD (computational fluid dynamics) calculation, respectively, in which the orientation of an arrow indicates the flow direction of the gas and the length of the arrow indicates the flow speed. FIGS. 9A and 9B illustrate results of the same obtained by the CFD calculation, in which the flow speed of the gas within the combustion chamber is indicated by color and darker color in grey scale indicates higher flow speed. FIGS. 10A and 10B illustrate calculation results of temperature of the gas within the combustion chambers corresponding to FIGS. 8A and 8B, respectively, in which darker color in grey scale indicates higher temperature. Note that the combustion chambers of the pair FIGS. 8A and 8B have the same volume, as do the pair FIGS. 9A and 9B, and the pair FIGS. 10A and 10B. Moreover, the results in these drawings are obtained by using a four-cylinder engine of 1500 cc of which the compression ratio is about 14.8:1, and the results in FIGS. 8A, 9A, and 10A are obtained in a case where the stepped portion volume ratio VR is 0.07, and the height h of the stepped portion volume section is 1.0 mm.

By comparing FIG. 8A with FIG. 8B, it can be understood that the flow speed of the gas in the periphery of the lip portion 71d (the section indicated by Z1) is slower in this embodiment in which the stepped portion 73 is provided (FIG. 8B) than the case where the stepped portion 73 is not provided (FIG. 8A). Moreover, when FIG. 9A is compared with FIG. 9B, it can be understood that the spread of high-speed gas (existing area of high-speed gas) in the periphery of the lip portion 71d (the section indicated by Z1) is reduced to be smaller in this embodiment in which the stepped portion 73 is provided (FIG. 9B) than the case where the stepped portion 73 is not provided (FIG. 9A).

Moreover, when FIG. 10A is compared with FIG. 10B, in this embodiment in which the stepped portion 73 is provided (FIG. 10B), high-temperature gas is separated from the wall surface of the combustion chamber 9 in the periphery of the lip portion 71d (the section indicated by Z1) and comparatively low-temperature gas exists in the section closer to the wall surface than the high-temperature gas and contacts with the wall surface, and in the case where the stepped portion 73 is not provided (FIG. 10A), the high-temperature gas substantially directly contacts with the wall surface in the periphery of the lip portion 71d (the section indicated by Z1).

Here, when the heat transmissibility between the gas and the wall surface is αg, the wall surface area is Fg, the temperature of the gas is Tg, and the temperature of the wall surface is Twi, the heat transfer amount Qh from the gas to the wall surface is simply expressed by the following Equation 1.

$$Qh = \int \alpha g \times Fg \times (Tg - Twi) dt \quad (1)$$

Further, the heat transmissibility αg is approximated by the following Equation 2, wherein the flow speed of the gas is vg, a pressure of the gas is P, the temperature of the gas is Tg, and a bore diameter of the cylinder 2 is D. Note that C is a coefficient.

$$\alpha g = C \times D^{-0.214} (vg \times P)^{0.783} \times Tg^{-0.525} \quad (2)$$

Thus, the flow speed vg of the gas in the periphery of the lip portion 71d is reduced to be lower and the spread of the high-speed gas is suppressed more in this embodiment in which the stepped portion 73 is provided than the case where the stepped portion 73 is not provided as described above. Therefore, an average value of the heat transmissibility αg in the periphery of the lip portion 71d becomes small. Additionally, the temperature Tg of the gas that contacts with the wall surface in the periphery of the lip portion 71d is reduced to be lower in this embodiment in which the stepped portion 73 is provided than the case where the stepped portion 73 is not provided. Therefore, the heat transfer amount Qh to the wall surface becomes smaller in this embodiment in which the stepped portion 73 is provided than the case where the stepped portion 73 is not provided.

By providing the stepped portion 73 and disposing the first portion 74, which is provided continuously from the lip portion 71d, on the lower side of the stepped portion 73 so as to secure a large volume above the lip portion 71d and the first portion 74 as above, in this embodiment, the heat transfer amount from the combustion gas to the lip portion 71d, the first portion 74, and therearound is reduced and the cooling loss is also reduced.

(3-3) Soot

Here, by providing the stepped portion 73 to secure a large volume above the lip portion 71d and the first portion 74, the cooling loss can be reduced as described above. Therefore, it can be assumed that by increasing the volume to be even larger, the reduction effect of the cooling loss can be increased to be higher still.

However, the present inventors conducted extensive research and found, as a result, that although the increase of the volume of the stepped portion volume section 74a corresponding to the volume above the lip portion 71d and the first portion 74 results in reducing the cooling loss and improving the fuel consumption, if the volume is excessively increased, the soot generation amount will be increased.

The following reasons can be considered as the cause of this result.

For each vehicle, the emission, specifically the volume of the cylinder 2, is set in advance. Further, for each vehicle, the compression ratio has a limitation in its variety in view of the engine output, the fuel consumption, the emission performance, etc. Therefore, the volume of the entire combustion chamber 9 has a limitation for each vehicle. For example, in a four cylinder engine of which the emission is 1500 cc and the compression ratio is about 14.8:1, the volume of the combustion chamber 9 at the TDC is limited to about 30 cc. Therefore, if the stepped portion volume section 74a is increased, the volume of the cavity 70 needs to be accordingly reduced. If the volume of the cavity 70 is reduced, a sufficient tumble flow cannot stably be produced within the cavity 70 and the fuel and the air cannot be mixed sufficiently, causing a larger soot generation amount.

For example, by comparing FIG. 8A with FIG. 8B, it can be understood that in the section indicated by Z2, the flow speed of the gas is lower (length of the arrows are shorter) and the strength of the tumble flow is weaker in the embodiment in which the volume of the cavity 70 is reduced since the stepped portion 73, specifically the stepped portion volume section 74a, is provided (FIG. 8B) than the case where the stepped portion 73, specifically the stepped portion volume section 74a, is not provided and a comparatively large volume is secured for the cavity 70 (FIG. 8A).

(4) Relationship Between Ratio of Volume and Performance

Figure 11:
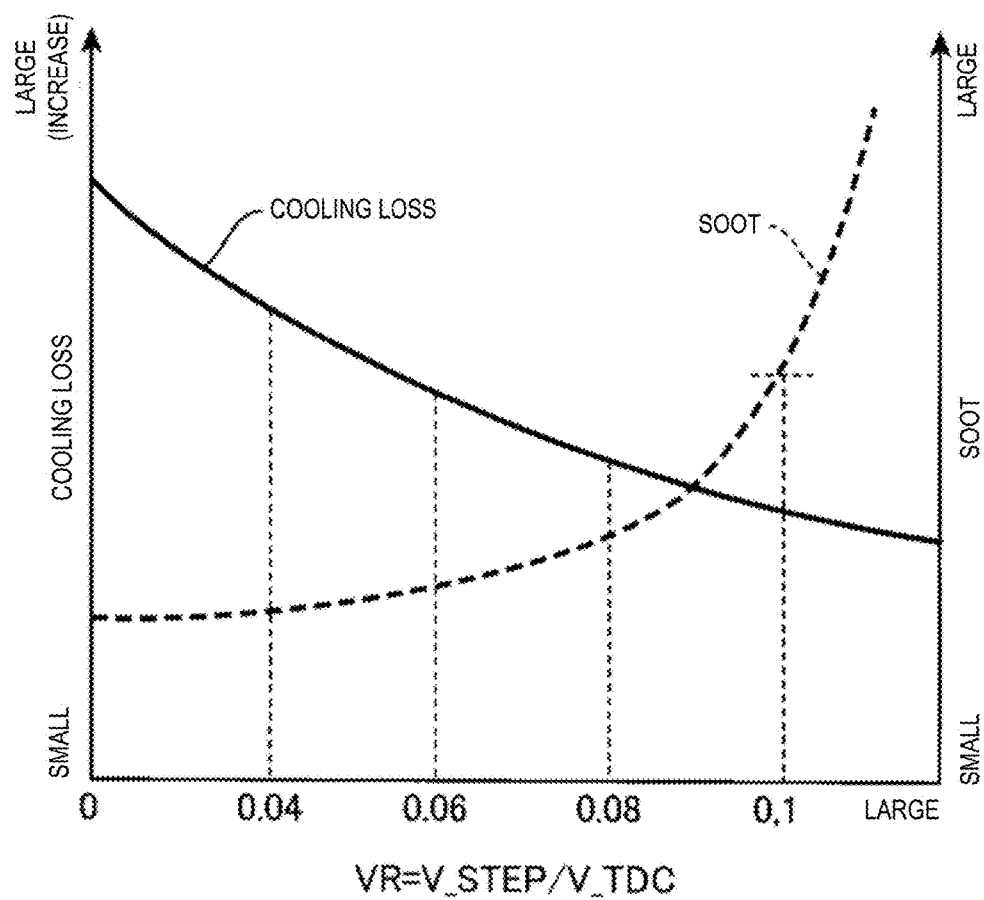
FIG. 11 is a chart illustrating a relationship of a stepped portion volume ratio with a cooling loss and a soot generation amount.

From the above results, the present inventors thought there may be a suitable range for the size of the stepped portion volume section 74a, and conducted deeper research on this matter. As a result, it was found that the stepped portion volume ratio VR=V_STEP/V_TDC that is the ratio between the stepped portion volume V_STEP which is the volume of the stepped portion volume section 74a, and the volume V_TDC of the combustion chamber 9 in the state where the piston 4 is at the TDC, has a relationship as illustrated in FIG. 11, with soot and the cooling loss. Further, it was discovered that by providing the stepped portion 73, specifically the stepped portion volume section 74a, and controlling the stepped portion volume ratio VR to be within a predetermined range, the generation amount of soot can be controlled to be within a suitable range while reducing the cooling loss and improving the fuel consumption.

FIG. 11 is a chart illustrating changes of the generation amount of soot and the cooling loss with respect to the stepped portion volume ratio VR, in which the solid line is the cooling loss and the dashed line is the generation amount of soot. In FIG. 11, the cooling loss and the generation amount of soot become larger as the lines reach higher, respectively.

Figure 12:
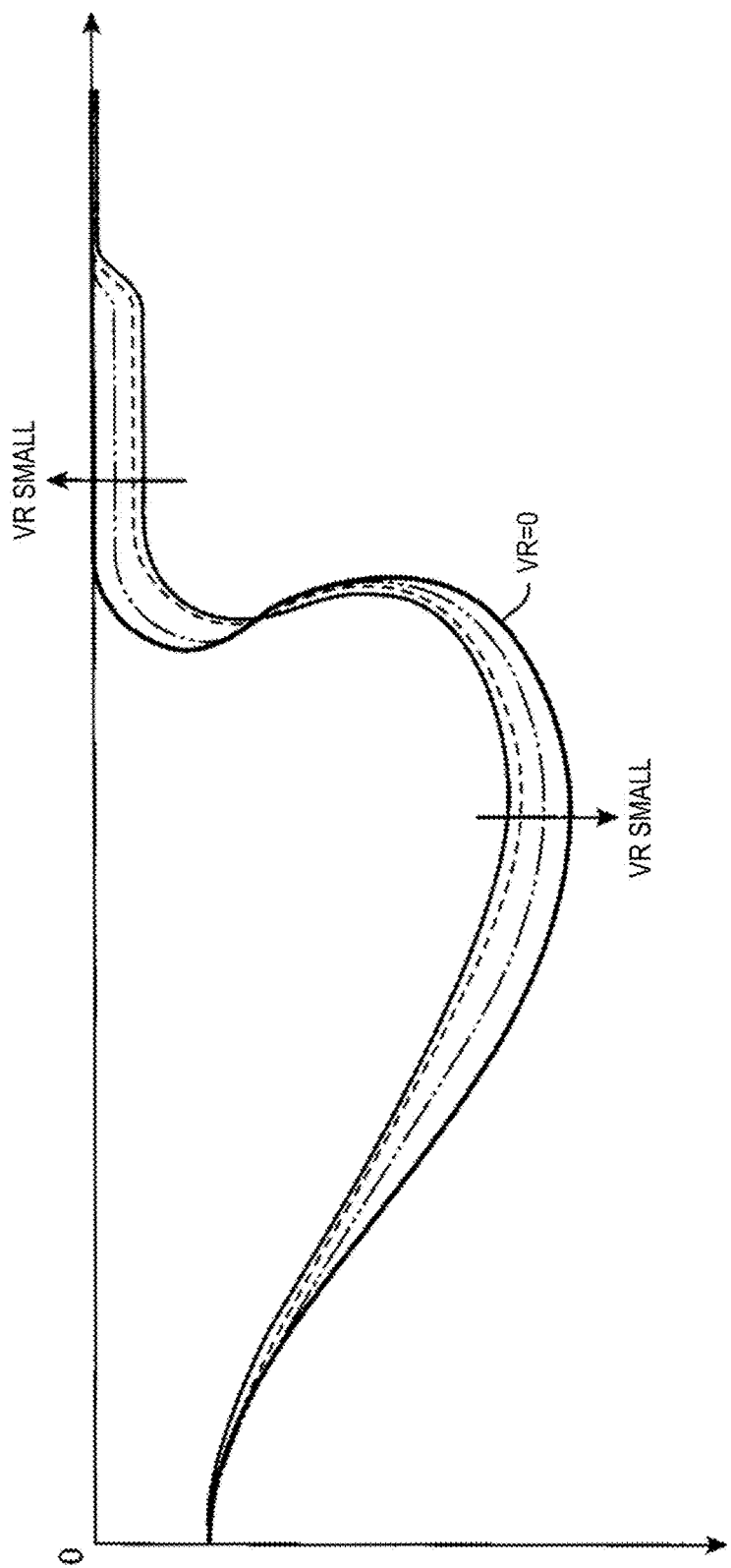
FIG. 12 is a view illustrating shapes of the combustion chamber when the height of the stepped portion is changed.
Figure 13:
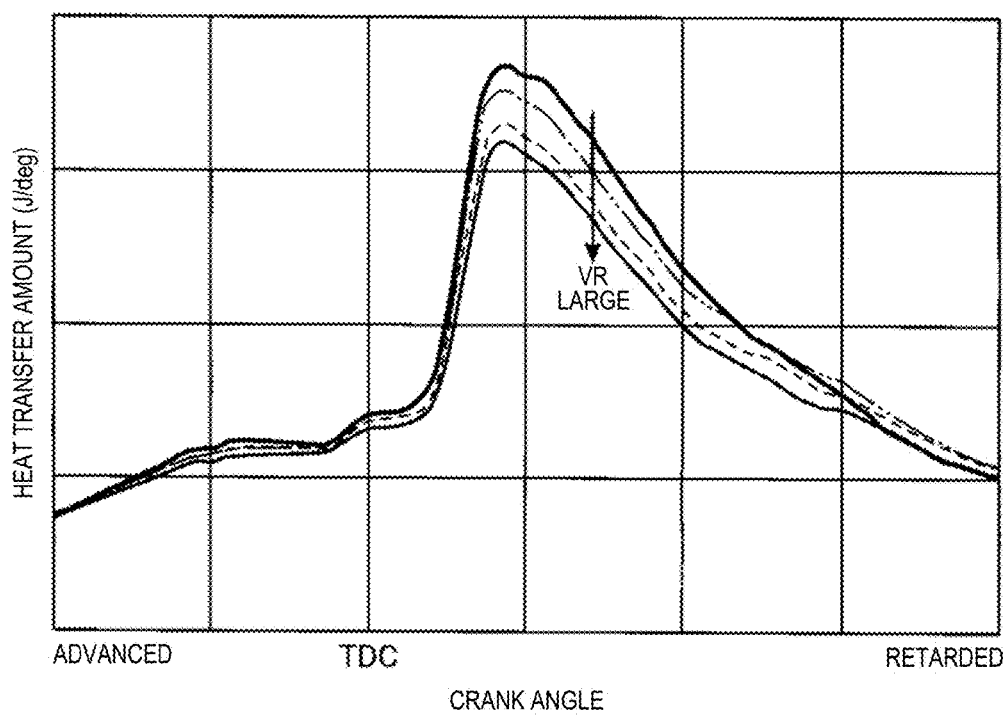
FIG. 13 is a chart illustrating a relationship of the stepped portion volume ratio with a change rate of a heat transfer amount.

Here, FIG. 11 illustrates results obtained when the stepped portion volume ratio VR is changed by changing the height h of the stepped portion 73 and the depth of the cavity 70 under a condition that the distance from the cylinder central axis X1 to the boundary of the lip portion 71d and the periphery concave portion 71c is the same as illustrated in FIG. 12. In other words, to reduce the adhesion of the fuel onto the wall surface of the cavity 70, and further, to reduce the increase of soot, a certain length of distance needs to be secured from the cylinder central axis X1 to the boundary of the lip portion 71d and the periphery concave portion 71c as described above. Therefore, the distance is fixed to a minimum value for the length with which the adhesion of the fuel can be avoided, and the height h of the stepped portion 73 and the depth of the cavity 70 are changed. Note that FIG. 12 illustrates shapes of the combustion chamber when the height h of the stepped portion 73 is changed from 0 (no stepped portion volume section) to 0.5, 1.0, and 1.3 mm, in the four cylinder engine of which the emission is 1500 cc and the compression ratio is about 14.8:1. Moreover, a change of the heat transfer amount to the wall surface of the combustion chamber 9 per one crank angle degree, when the stepped portion volume ratio VR is changed as illustrated in FIG. 12, is illustrated in FIG. 13. In FIG. 13, the lateral axis is the crank angle and the vertical axis is the heat transfer amount per one crank angle degree, and the heat transfer amount becomes large after the TDC where the combustion is performed.

As illustrated in FIG. 13, when the stepped portion volume ratio VR is increased, the heat transfer amount from the combustion gas to the wall surface of the combustion chamber 9 becomes smaller. Further, as illustrated in FIG. 11, when the stepped portion volume ratio VR is increased, the cooling loss becomes smaller, whereas the generation amount of soot becomes larger.

Note that, the cooling loss becomes smaller substantially in proportion to the increase of the stepped portion volume ratio VR, whereas the generation amount of soot drastically increases after the stepped portion volume ratio VR exceeds 0.1. Therefore, also in the case where the stepped portion 73 and the stepped portion volume section 74a are provided to reduce the cooling loss, the stepped portion volume ratio VR needs to be 0.1 or smaller. In other words, by providing the stepped portion 73 and the stepped portion volume section 74a and setting the stepped portion volume ratio VR to 0.1 or smaller, the drastic increase of soot can be avoided while reducing the cooling loss.

However, as illustrated in FIG. 11, if the stepped portion volume ratio is set smaller than 0.04, while the generation amount of soot hardly changes even if the stepped portion volume ratio VR is changed, the cooling loss increases if the stepped portion volume ratio VR is reduced. Therefore, it can be said that the stepped portion volume ratio VR is preferably set to 0.04 or larger to effectively reduce the cooling loss while controlling the generation amount of soot to be small.

Moreover, as illustrated in FIG. 11, the line for soot curves sharper at the stepped portion volume ratio VR=0.08, and the increase rate of soot (inclination of the line for soot) drastically increases when the stepped portion volume ratio VR exceeds 0.08 and increases even larger. Therefore, in the case where the stepped portion volume ratio VR is set to about 0.08, if the volume of the stepped portion volume section 74a varies (varies to increase), for example, due to manufacturing variation, thermal expansion variation within the cylinder head, or accumulation of soot in the stepped portion volume section 74a, variation (increase amount) of soot becomes larger and a control of suppressing the generation amount of soot within an assumed range may fail. Moreover, the line for the cooling loss curves sharper at the stepped portion volume ratio VR=0.06, and the increase rate of the cooling loss (inclination of the line for the cooling loss) slightly increases when the stepped portion volume ratio VR falls below 0.06 and decreases even smaller. Therefore, when the stepped portion volume ratio VR is set to about 0.06, variation (increase amount) of the cooling loss becomes larger due to any of the above variations, and a control of suppressing the cooling loss and even the fuel consumption within an assumed range may fail. Thus, to secure stable soot reduction effect and fuel consumption, it is preferable to set the stepped portion volume ratio VR to be between 0.06 and 0.08.

(5) Effects of this Embodiment

For the above reason, in this embodiment, the stepped portion volume ratio VR is set to 0.07. Therefore, both the high soot reduction effect and high fuel consumption can be achieved and these performance effects can stably be secured.

Moreover, the height h of the stepped portion 73, which corresponds to the vertical separation distance between the first and second portions 74 and 75, is set to 1.0 mm. Therefore, for example, even if soot is accumulated on the first portion 74, the volume of the stepped portion volume section 74a can be secured and the fuel consumption can be kept high. Specifically, it is known that the soot is generally accumulated on the radially outward part of the piston crown surface 4a with respect to the cavity 70 and the maximum accumulation height becomes about 0.4 mm. Therefore, even in the case where the soot is accumulated on the first portion 74, the height h of the stepped portion 73 is desirably set to 0.5 mm or higher so as to secure the volume of the stepped portion volume portion 74a. In this embodiment, since the height h of the stepped portion 73 is set to 1.0 mm, even if the soot is accumulated, the volume of the stepped portion section 74a can be secured and the cooling loss can be reduced. Note that an upper limit of the height h of the stepped portion 73 may be determined based on the stepped portion volume ratio VR, as long as the height h is 0.5 mm or higher.

(6) Modifications

In this embodiment, the case where the stepped portion volume ratio VR is 0.07 is described; however, as described above, as long as the stepped portion volume ratio VR is at least controlled to 0.1 or smaller, excessive increase of the generation amount of soot can be suppressed while reducing the cooling loss. Therefore, the stepped portion volume ratio VR is suitably changeable within the range of 0.1 or smaller. Note that the cooling loss can effectively be reduced if the stepped portion volume ratio VR is set to 0.04 or larger. Moreover, low fuel consumption and high emission performance (soot reduction effect) can be stably obtained if the stepped portion volume ratio VR is set to be between 0.06 and 0.08.

Moreover, for example, in a case where the accumulation amount of the soot can be reduced to be smaller, the height h of the stepped portion 73 may be set to be lower than 0.5 mm while setting the stepped portion volume ratio VR to be within the range described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

9 Combustion Chamber
5 Cylinder Head
4a Piston Crown Surface
70 Cavity
72 Outer Circumferential Part
73 Stepped Portion
74 First Portion
75 Second Portion

What is claimed is:

1. A structure of a combustion chamber formed inside a diesel engine, defined by an inner surface of a cylinder, a crown surface of a piston, and a bottom surface of a cylinder head, and for being injected with fuel therein, the piston being reciprocatable within the cylinder, the cylinder head opposing the crown surface of the piston, the structure comprising:
- a cavity formed in a central part of the crown surface of the piston to concave in a direction away from the bottom surface of the cylinder head;
- a fuel injector attached to the cylinder head, arranged such that a central axis of the fuel injector matches a central axis of the cylinder, the fuel injector having a plurality of nozzle holes formed to spread the fuel radially relative to the central axis of the fuel injector; and
- a wall surface constituting the cavity, the wall surface having a central ridge portion bulging farther toward the bottom surface of the cylinder head toward the center of the cavity, a periphery concave portion formed outward of the central ridge portion in a radial direction of the piston and formed to concave radially outward in a vertical cross-section, and a lip portion formed between the periphery concave portion and an opening edge of the cavity and formed to convex radially inward in the vertical cross-section, wherein the fuel injector is arranged such that the fuel is injected toward a position near a boundary of the lip portion and the periphery concave portion in a case where the piston is near a compression TDC;

wherein an outer circumferential part of the crown surface of the piston has a first portion configured as a flat surface formed continuously from the lip portion and a second portion located radially outward of the first portion, the outer circumferential part corresponding to a radially outward part with respect to the lip portion of the cavity;

wherein the first portion is located in the direction away from the bottom surface of the cylinder head with respect to the second portion, so as to form a stepped portion between the first and second portions;

wherein a stepped portion volume ratio VR defined by V_STEP/V_TDC is set to 0.1 or smaller and 0.04 or larger, in which V_STEP is a stepped portion volume and V_TDC is a top dead center volume, the stepped portion volume being a volume of a part of the combustion chamber that is defined by the wall surface of the piston across the lip portion, the flat surface and the stepped portion, a surface passing through a radially inner edge of the lip portion and extending in parallel to a central axis of the cylinder, and a surface passing through a connecting position of the stepped portion and the second portion and extending perpendicularly to the central axis of the cylinder, the top dead center volume being a volume of the combustion chamber in a state where the piston is at a top dead center;

wherein the stepped portion includes only a single stepped portion;

wherein the periphery concave portion is curvy;

wherein the lip portion is curvy; and wherein a curvature from the lip portion toward the periphery concave portion continuously changes with no linear portion.

2. The structure of claim 1, wherein a height of the stepped portion is set to 0.5 mm or higher.

3. The structure of claim 1, wherein the stepped portion volume ratio VR is set to be within a range of 0.06 to 0.08.

* * * * *